United States Patent [19]

Andō

[11] Patent Number: 5,018,127
[45] Date of Patent: May 21, 1991

[54] LIGHT EMITTING APPARATUS HAVING A PLURALITY OF LIGHT EMITTING POINTS

[75] Inventor: Hideo Andō, Kawasaki, Japan

[73] Assignee: Kabushiki Kaisha Toshiba, Kawasaki, Japan

[21] Appl. No.: 427,986

[22] Filed: Oct. 30, 1989

Related U.S. Application Data

[63] Continuation of Ser. No. 101,486, Sep. 28, 1987, abandoned.

[30] Foreign Application Priority Data

Sep. 27, 1986 [JP] Japan .................................. 61-229139

[51] Int. Cl.[5] .............................................. G11B 7/00
[52] U.S. Cl. .................................................. 369/112
[58] Field of Search ................ 350/413, 255; 362/800; 369/44, 45, 46, 112, 116; 372/45, 49; 250/201, 202

[56] References Cited

U.S. PATENT DOCUMENTS

| | | | |
|---|---|---|---|
| 3,983,317 | 9/1976 | Glorioso | 178/6.6 R |
| 4,115,809 | 9/1978 | Ueno | 358/128 |
| 4,520,471 | 5/1985 | Carlin | 369/112 |
| 4,520,472 | 5/1985 | Reno | 369/112 |
| 4,561,717 | 12/1985 | Kataoka et al. | 350/6.8 |
| 4,694,447 | 9/1987 | Cohen et al. | 369/110 |
| 4,700,336 | 10/1987 | Yoshida et al. | 369/44 |
| 4,710,911 | 12/1987 | Yamada et al. | 369/100 |
| 4,718,052 | 1/1988 | Kondo et al. | 369/44 |
| 4,733,065 | 3/1988 | Hoshi et al. | 250/201 |
| 4,763,134 | 8/1988 | Murahashi et al. | 346/1.1 |

*Primary Examiner*—Frank Gonzalez
*Attorney, Agent, or Firm*—Finnegan, Henderson, Farabow, Garrett, and Dunner

[57] ABSTRACT

In a light emitting apparatus, a semiconductor laser has first and second laser structures provided with first and second laser beam emitting points, respectively, and a retrieving or recording laser beam and an erasing laser beam are emitted from the first and second laser emitting points of the laser structures, respectively. A cylindrical lens is located in front of the second laser beam emitting point so that the erasing laser beam is converged in a first plane and is not converged in a second plane normal to the first plane. The erasing laser beam emerged from the cylindrical lens is converged onto a recording surface of a recording medium by an objective lens to form an elliptical beam spot on the recording surface.

32 Claims, 6 Drawing Sheets

LIGHT EMITTING APPARATUS HAVING A PLURALITY OF LIGHT EMITTING POINTS

This application is a continuation of application Ser. No. 101,486, filed Sept. 28, 1987 (now abandoned).

BACKGROUND OF THE INVENTION

The present invention relates to a light emitting apparatus having a plurality of light emitting points capable of generating light beams, respectively and, more particularly, to an improvement of a light emitting apparatus for generating a retrieving or recording light beam or an erasing light beam, which is incorporated in an information recording, retrieving, and erasing system for optically recording information, and retrieving and erasing the recorded information.

In an information recording, retrieving, and erasing system for optically recording information, and retrieving and erasing the recorded information, in a recording mode, a recording beam which is intensity modulated in accordance with information to be recorded is focused on an information recording medium, and a recording film of the information recording medium causes a change in phase from a crystal state to a noncrystal state or the crystal structure of the recording film of the information recording medium is changed, thus recording the information. In a retrieving mode, a retrieving beam having a predetermined intensity lower than that of the recording beam is focused on the recording film of the information recording medium, whose phase is changed, or the recording film of the information recording medium, whose crystal structure is changed, thus retrieving the information. In an erasing mode, an erasing beam having a predetermined intensity higher than that of the retrieving beam is focused on the the recording film of the information recording medium, whose phase is changed, or the recording film of the information recording medium, whose crystal structure is changed, thus erasing the information. In general, according to recording and erasing processes on the information recording medium, a circular beam spot is formed on the information recording medium by the recording or retrieving beam, and an elliptic beam spot is formed on the recording medium by the erasing beam. Such a system is disclosed in, e.g., U.S. patent application Ser. Nos. 673764 (now abandoned), 705305 (now U.S. Pat. No. 4,689,781), 713598 (now U.S. Pat. No. 4,694,443), 93644 (now U.S. Pat. No. 4,804,835), 018489 (now abandoned), and 018493 (now U.S. Pat. No. 4,825,064), filed on Nov. 21, 1984; Feb. 25, 1985; Mar. 19, 1985; Dec. 1, 1986; Feb. 25, 1987; and Feb. 25, 1987.

Conventionally, the following two systems are known. One system employs an optical system wherein two light sources, e.g., semiconductor lasers are arranged at different positions to be separated from each other, and laser beams from the two light sources propagate toward an information recording medium along a identical optical path. The other system employs a single light source having light emitting points for emitting light beams, e.g., a semiconductor laser array. In the former system, the optical system is complicated, and becomes bulky. As a result, the weight of an optical head is increased to prolong an access time. In the latter system, one of the two light emitting points of the semiconductor laser array must emit a circular laser beam to form a substantially circular beam spot on the information recording medium, and the remaining light emitting point must emit an elliptic laser beam to form a substantially elliptic beam spot on the information recording medium. However, it is difficult to design the semiconductor laser array so that a substantially elliptic beam spot having a sufficiently large elliptic ratio and a predetermined size is formed on the information recording medium. Even if such a semiconductor laser array can be designed, it is difficult to stably emit both the laser beams.

SUMMARY OF THE INVENTION

It is an object of the present invention to provide a light emitting apparatus having a plurality of light emitting points capable of emitting light beams, which can form an elliptic beam spot on an information recording medium at a predetermined elliptic ratio.

According to the present invention, there is provided a light emitting apparatus comprising a light source having a plurality of light emitting points which respectively emit light beams and are arranged adjacent to each other, and an optical element which is arranged in front of at least one light emitting point and through which the light beam emitted from the light emitting point passes, the optical element modifying the shape of the light beam.

DETAILED DESCRIPTION OF THE PREFERRED EMBODIMENTS

An information retrieving, recording and erasing system will now be explained below in connection with light emitting apparatus having a plurality of light beam emitting points.

Figure 1:
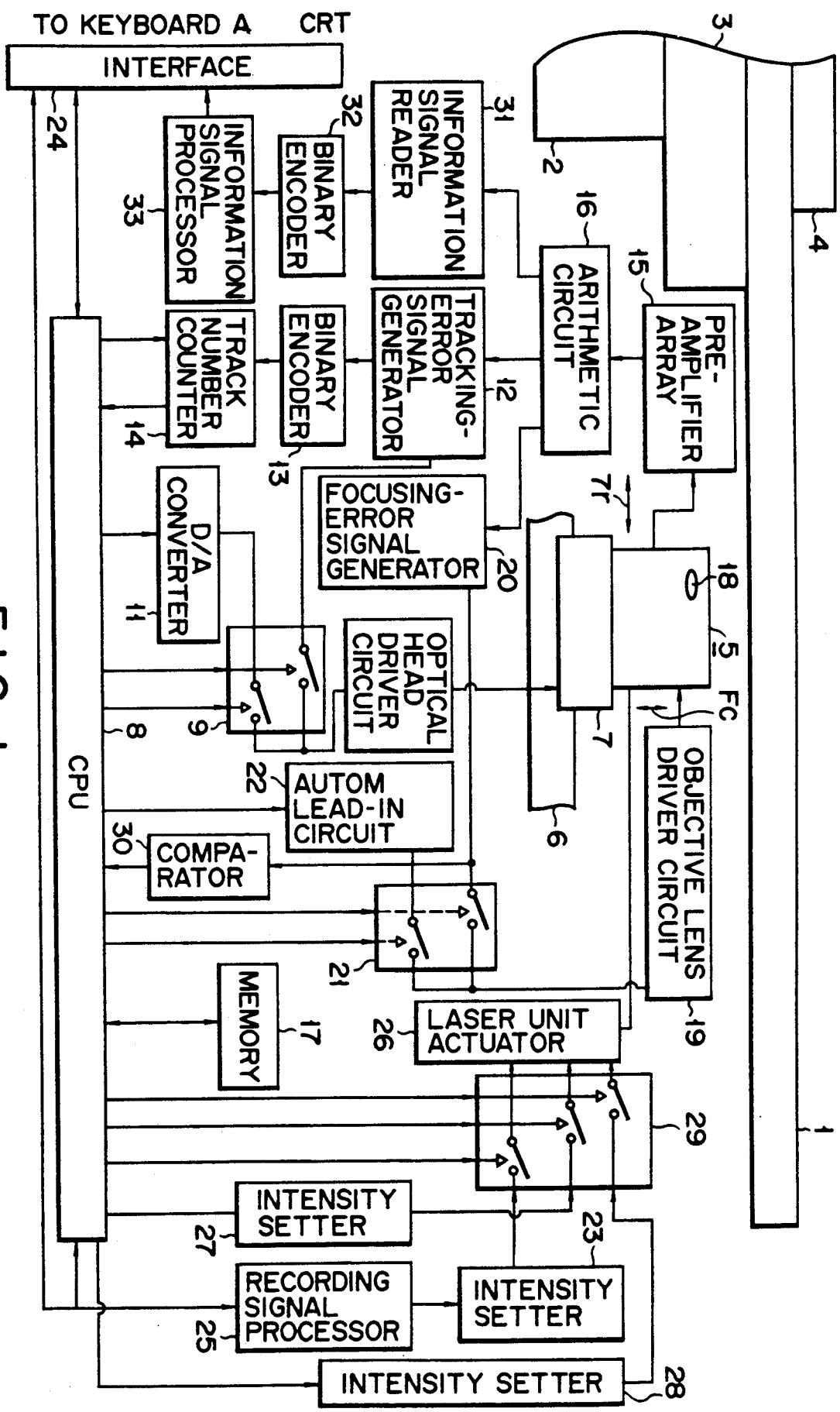
FIG. 1 is a block diagram showing information recording and reproduction system incorporating a light emitting apparatus of this invention.
Figure 2:
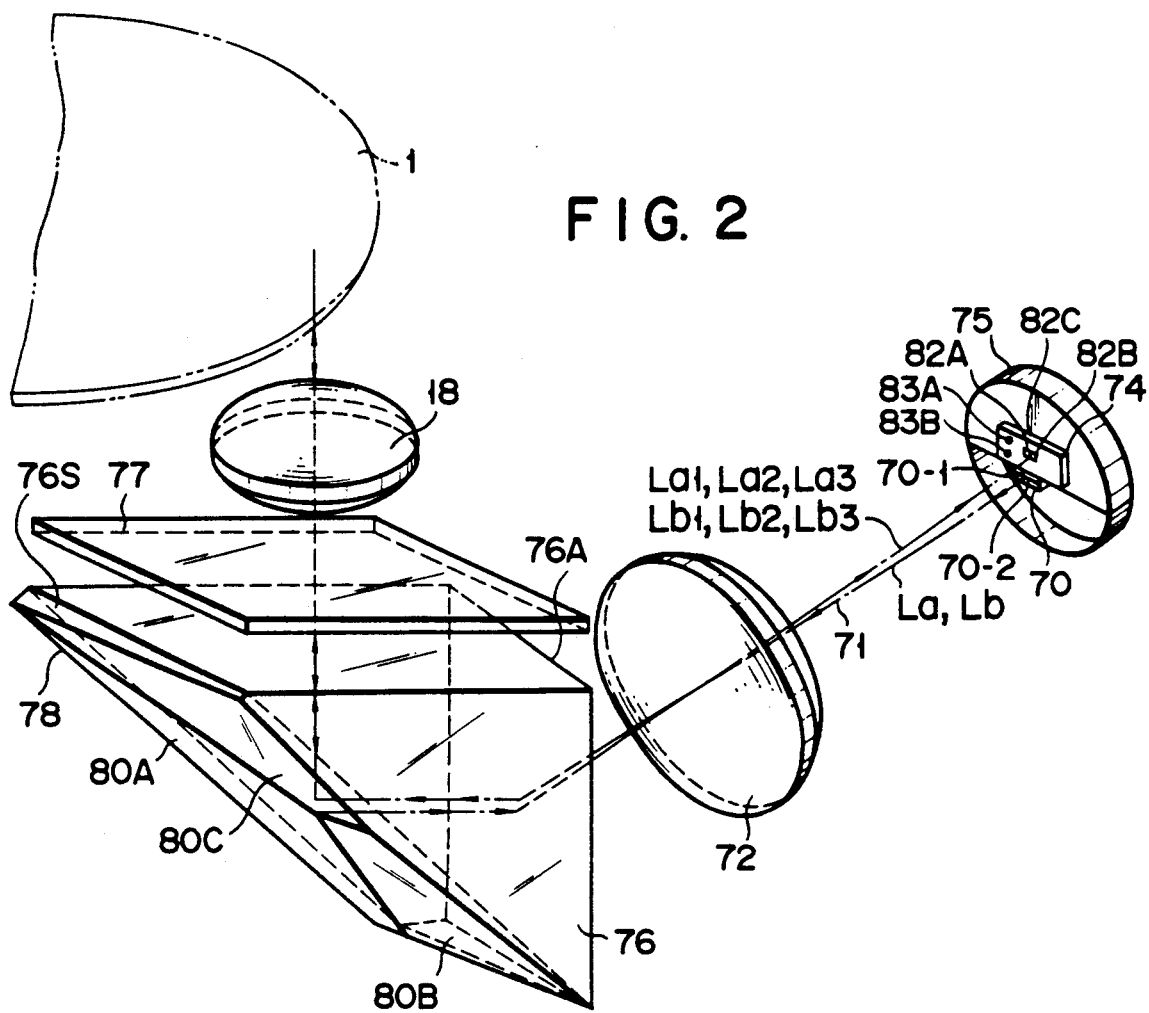
FIG. 2 is a perspective view schematically showing an optical system for the optical head of FIG. 1.

As shown in FIG. 1, an optical memory, e.g., optical disk 1, is mounted on turntable 3, which is rotated by driving shaft 2. Clamper 4 is disposed on disk 1 so as to hold the disk against turntable 3. Disk 1 has a record layer at least on its one side. Information can be recorded on or retrieved from the record layer. The layer is formed with a spiral or concentric tracking guide. Provided under disk 1 is optical head 5, which includes an optical system as shown in FIG. 2. Head 5 is mounted on carrier block 7, which is disposed within guide frame 6 so as to be slidable in the radial direction of disk 1.

In the access mode, CPU 8 receives, from memory 17, an access program for moving optical head 5 to access the tracking guide. Then, CPU 8 delivers an access mode signal to analog switch unit 9, whereby it is connected to optical-head driver circuit 10 through D/A converter 11. CPU 8 also supplies an access signal to optical head driver circuit 10 through D/A converter 11 so that circuit 10 is actuated. Circuit 10 delivers a drive signal to a head driving coil (not shown). As a result, head 5 is transported in the direction of arrow Tr along guide frame 6. In the access mode, the tracking guides are counted, starting from a predetermined position or a previously accessed tracking guide. Thus, the tracking guides are recognized one after another. In other words, output signals from tracking-error signal generator 12 are binary-coded by binary encoder 13, which generates one pulse each time head 5 crosses one tracking guide. The pulses, and hence the tracking guides, are counted by track number counter 14. CPU 8 delivers the tracking mode signal to analog switch unit 9 to change the operation mode from the access mode to the tracking mode, whereupon counter 14 in which a maximum number to be counted is preset, by CPU 8 in the access mode, generates a stop signal to stop the access movement of optical head 5 after the end of access. Switch unit 9 connects tracking-error signal generator 12 to optical head driver circuit 10, in response to the tracking mode signal. Thus, the correction of a tracking error is started. Photoelectric signals delivered from photodetector of head are amplified by preamplifier array 15, and processed by arithmetic circuit 16, including adders and other elements. The processed signals are supplied to signal generator 12, whereupon generator 12 delivers a tracking-error signal. The tracking-error signal is supplied through analog switch unit 9 to driver circuit 10 for moving optical head 5. As a result, head 5 is moved, thus correcting the tracking error. If objective lens 18 is in the defocusing state, head 5 is moved in the direction of arrow Fc by objective-lens driver circuit 19, in response to a focusing-error signal from focusing-error signal generator 20. Thereupon, lens 18 is kept in the focusing state. Immediately before the focusing servo loop is closed, switch unit 21 is shifted so that objective lens driver circuit 19 is connected to automatic lead-in circuit 22. As a result, circuit 19 is actuated, so that objective lens 18 is returned to its initial position.

Recording beam intensity setter 23 is supplied with a recording signal from an external device via interface 24 and recording signal processor 25 for generating a recording signal. The recording signal is responsive to information data to be stored in the optical memory, and an actuating signal, corresponding to the recording signal, is supplied to laser array of head 5 from laser unit actuator 26 so that a recording laser beam is emitted from laser array. In response to a command supplied externally through interface 24, a retrieving-mode signal is delivered from retrieving beam intensity setter 27 so that an actuating signal is supplied to laser array from actuator 26. Also, an erasing mode signal is delivered from erasing beam intensity setter 28, in response to the command, so that an actuating signal is supplied to laser array 11 from actuator 26. Analog switch unit 29 is shifted in response to commands for individual modes from CPU 8, so that the corresponding signals are supplied to laser unit actuator 26.

In an erasing mode, when the amount of defocus increases above a predetermined value, then the erasing laser beam disappears. That is, when the focusing-error signal from focusing-error signal generator 20 reaches a predetermined level, a high-level signal is generated from comparator 30 connected to focusing-error signal generator 20, and a command for suspending the erasing mode is supplied from CPU 8 to analog switch unit 29 so that the erasing laser is deenergized. When the focusing-error signal again regain a lower-than predetermined level, a low-level signal is generated from comparator 30 connected to focusing-error signal generator 20. A command for regaining the erasing mode is supplied from CPU 8 to switch unit 21, thus energizing the erasing laser. As a result, information is prevented from being erroneously erased for the case where a greater amount of defocus is involved for the objective lens.

The signals processed by arithmetic circuit 16 are read by information signal reader 31, and binary-coded by binary encoder 32. Then, the signals are supplied to information signal processor 33 for modulation and demodulation of information signals and for error correction. Thereupon, the signals are converted into a regenerative signal, which is delivered to the external device, for example, a CRT through interface 24.

In optical head 5, as shown in FIG. 2, semiconductor laser array 70, having first and second laser structures 70-1 and 70-2 for emitting recording or retrieving laser beam La and erasing laser beam Lb, respectively, is disposed on optical axis 71 of convex lens 72, which serves both as a collimator lens and a projection lens. The light emitting points of laser array 70 are located on the focal plane of lens 72. Photodetector 74 is disposed close to laser array 70. Laser array 70 and photodetector 74 are fixed on mount 75. Divergent laser beams La and Lb are emitted from laser emitting points of array 70. As they pass through lens 72, the beams are converted into collimated laser beams, and then projected on prism 76. Since prism 76 has its incidence surface 76A inclined relatively to optical axis 71 of lens 72, the cross section of each collimated laser beam is changed from an elliptic shape to a circular one, as the beam, incident on surface 76A, is refracted. As they advance in prism 76, the laser beams are reflected by polarizing surface 76S on the opposite side of the prism. Then, after passing through quarter-wave plate 77, the laser beams are converged on optical memory 1 by objective lens 18.

If the erasing and recording laser beams are applied to the record layer of optical memory 1, in a recording mode, information is erased successively from the record layer by the erasing laser beam, and new information is recorded on the erased region of the record layer by the recording laser beam. The information is recorded as a change of state of a domain, on the record layer. In a retrieving mode, the retrieving laser beam is emitted only from first semiconductor laser structure 70-1, and a laser beam is not emitted from second semiconductor laser structure 70-2. In an erasing mode, the erasing and retrieving laser beams ar applied to the record layer, so that the information is erased, and unerasable permanent record data, e.g., a sector address or track address recorded as prepits, is retrieved by the retrieving laser beam.

The laser beams reflected by optical memory 1 are introduced into prism 76 through objective lens 18 and quarter-wave plate 77, and then returned to polarizing surface 76S. Hereupon, as the laser beams pass back through through quarter-wave plate 77, their vibrating direction is turned 90°. Thus, the beams are converted into linearly polarized laser beams by plate 77. Returned to surface 76S, the laser beams are transmitted through it to be introduced into prism member 78, which is coupled to surface 76S and serves to separate the beams.

Figure 3:
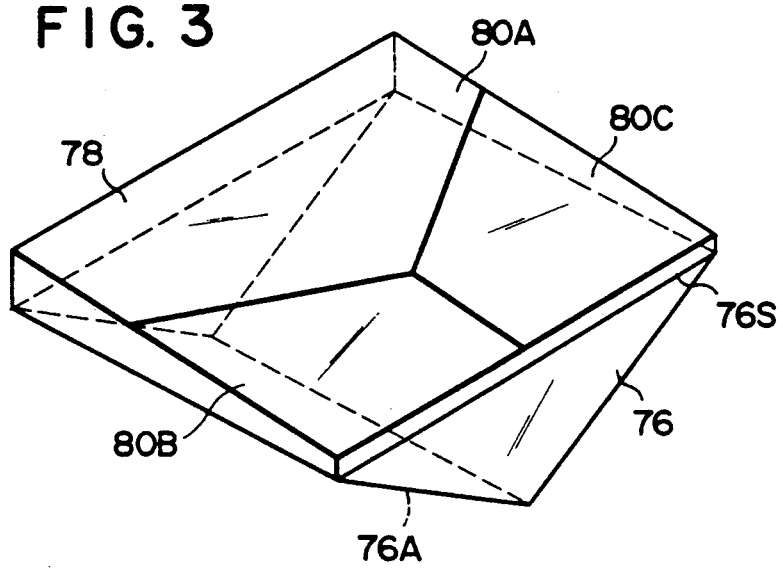
FIG. 3 is a perspective view showing a prism of FIG. 2.

As shown in FIG. 2, prism member 78, which is disclosed in U.S. patent application Ser. No. 862,829, filed on May 13, 1986, by Ando, (now U.S. Pat. No. 4,797,868 issued on Jan. 10, 1989) has three total-reflection surfaces 80A, 80B and 80C which adjoin at a certain angle to one another, extending nonparallel to polarizing surface 76S, as shown in FIG. 3. The boundary line between surfaces 80B and 80C extends substantially in the extending direction of the tracking guide, on optical memory 1, or that of an image of the tracking guide projected photodetector 74. Each of laser beams L1 and L2, reflected by total-reflection surfaces 80A, 80B and 80C, are separated into first, second and third laser beams La1, La2 and La3, or Lb1, Lb2 and Lb3, directed differently. Then, the beams pass again through polarizing surface 76S to be incident on convex lens 72. Laser beams La1, La2, La3, Lb1, Lb2 and Lb3 are directed to photodetector 74. First laser beams La1 and Lb1, reflected by reflecting surface 80A, are converged on a pair of photosensitive regions 82A and 82B for focusing-error detection. Second and third laser beams La2, La3, Lb2 and Lb3, reflected by reflecting surfaces 80B and 80C, respectively, are converged on a pair of photosensitive regions 83A and 83B arranged separately, for detecting a tracking error from a diffraction pattern which is produced when the laser beam is diffracted by the tracking guide.

In the optical system described above, the focusing error and tracking error are detected by the knife-edge method and push pull method, respectively. Refer to detailed descriptions in U.S. Pat. Nos. 4,585,933 and 4,546,460 and U.S. patent application Ser. No. 817,259 (now U.S. Pat. No. 4,631,395 issued on Dec. 23, 1986), by Ando, for the respective principles of these two methods.

Figure 4:
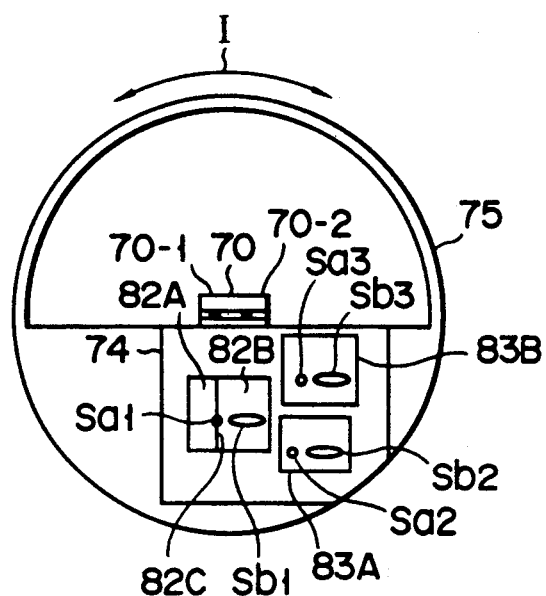
FIG. 4 is a perspective view showing an arrangement of a mount and electronic components on the mount as shown in FIG. 3.

First recording or retrieving laser beam La1, reflected by reflecting surface 80A and picked up, is deflected as objective lens 18 is moved along its optical axis. If lens 18 is in a focusing state, first laser beam La1 is directed to photo-insensitive region 82C between photosensitive regions 82A and 82B, as shown in FIG. 4. If lens 18 is in a defocusing state, on the other hand, beam La1 is directed to either region 82A or 82B.

In the retrieving mode, retrieving laser beam La is emitted only from first laser beam emitting point 70-1, so that only first retrieving laser beam La1 is reflected by reflecting surface 80B. In the erasing or recording mode, however, recording or retrieving laser beam La and erasing laser beam Lb are emitted from first and second semiconductor laser structures 70-1 and 70-2, so that first recording or retrieving laser beam La1 and first erasing laser beam Lb1 are reflected by reflecting surface 80A. Laser beam Lb1, like laser beam La1, is directed to one of photosensitive regions 82A and 80B. Thus, even though objective lens 18 is in the focusing state, beam spot Sb1, besides beam spot Sa1 on the photo-insensitive region 82C between photosensitive regions 82A and 82B, is formed on one of regions 82A and 82B by laser beam Lb1. A signal from one of regions 82A and 82B, produced by beam spot Sb1, is corrected by correction circuit (not shown) of focusing-error signal generator 20 in the following stage, which is disclosed in U.S. patent application Serial No. 018,489 (now abandoned), filed Feb. 25, 1987. Thus, objective lens 18 is always kept in the focusing state by a focusing-error signal delivered from generator 80.

The tracking guide is detected from the location of diffraction patterns which are produced in beam spot Sa2 formed on photosensitive regions 83A and 83B by second and third recording or retrieving laser beams La2, Lb2, La3, Lb3, which are reflected from reflecting surface 80B, 80C. If lens 18 is directed toward a desired track so that the track is traced correctly with laser beams L1 and L2, diffraction patterns of equal areas are produced in laser beam spots Sa2, Sb2 and Sa3, Sb3 on photosensitive regions 83A and 83B. As a result, photoelectric signals of equal levels are delivered from regions 83A and 83B. Accordingly, a differential amplifier (not shown) produces a tracking-error signal of a zero level, which indicates that the track is traced correctly with the laser beam. If the track is not traced correctly, diffraction patterns of different areas are produced in laser beam spots Sa2, Sb2 and Sa3, Sb3 on regions 83A and 83B. As a result, photoelectric signals of different levels are delivered from regions 83A and 83B. Accordingly, the amplifier produces a tracking-error signal of a plus or minus level, which indicates that the desired track is not traced correctly.

In the optical system shown in FIG. 2, incidence surface 76A of prism 76 is inclined relatively to optical axis 71 of convex lens 72. Therefore, the cross section of the collimated laser beam is changed from an elliptic shape to a circular one, as the beam, incident on surface 76A, is refracted. Also, the laser beam, reflected by the reflecting surface of prism 76 and directed to convex lens 72, is refracted by surface 76A. Thus, the cross-sectional shape of the beam is changed, and the beam diameter is increased substantially. As the beam diameter is increased in this manner, the image magnification of the optical system is enlarged, so that the focusing-error sensing capability of the system can be improved, as disclosed in U.S. patent application Ser. No. 742,396, filed on June 7, 1985, by Ando (now U.S. Pat. No. 4,716,283 issued on Dec. 29, 1987). Especially in the optical system using the knife-edge method, as shown in FIG. 3 the laser beam is elongated in the direction of deflection, in accordance with the size of tracking error. Accordingly, the susceptibility of the laser beam to deflection is increased, so that the focusing-error sensing capability of the system is improved particularly.

As shown in FIG. 4, mount 75 is in the form of a cylindrical part rotatable in the direction of arrow I. The center of rotation of mount 75 is in alignment with the optical axis of convex lens 72, so that the first light emitting point of semiconductor laser array 70 is located on the center of mount 75 and at a focal plane of convex lens 72. Thus, even though mount 75 is rotated, the laser beam can travel in an optical path along a fixed optical axis. If mount 75 is rotated in direction I, photosensitive regions 82A and 82B for focusing-error detection are rotated in the same direction. Namely, first recording and retrieving laser beam La are focused on a predetermined point when objective lens 18 is in the focusing state, and photosensitive regions 82A and 82B can be moved to the predetermined point when mount 75 is rotated in direction I. In other words, the beam spot is moved substantially in the circumferential direction of mount 75, on regions 82A and 82B. In assembling or adjusting optical head 5, therefore, the optical system for focus detection can be adjusted easily by rotating mount 75 so that the beam spot is formed on the photosensitive region between regions 82A and 82B, while keeping objective lens 18 in the focusing state. In adjusting the optical system for tracking-guide detection, polarizing prism 76 is shifted along a ridge line between first and second surfaces 80A and 80, so as to form the beam spot equally distributed on photosensitive regions 83A and 83B for tracking-guide detection, while keeping lens 18 in the focusing state. First laser beam spots Sa1 and Sb1 are not shifted on photodetector 74, and only second and third laser beam spots Sa2, Sb2, Sa3 and Sb3 are shifted in a direction along which regions 83A and 83B are arranged. Thereupon, objective lens 18 is maintained in the focusing state, and polarizing prism 76 is shifted along the ridge line between first and second reflecting surfaces 80A and 80B. To facilitate the adjustment of the optical system, mount 75 and convex lens 72 are supported by a lens barrel (not shown) for joint rotation.

The structure of a light emitting apparatus according to an embodiment of the present invention will be described in detail with reference to FIG. 5.

Figure 5:
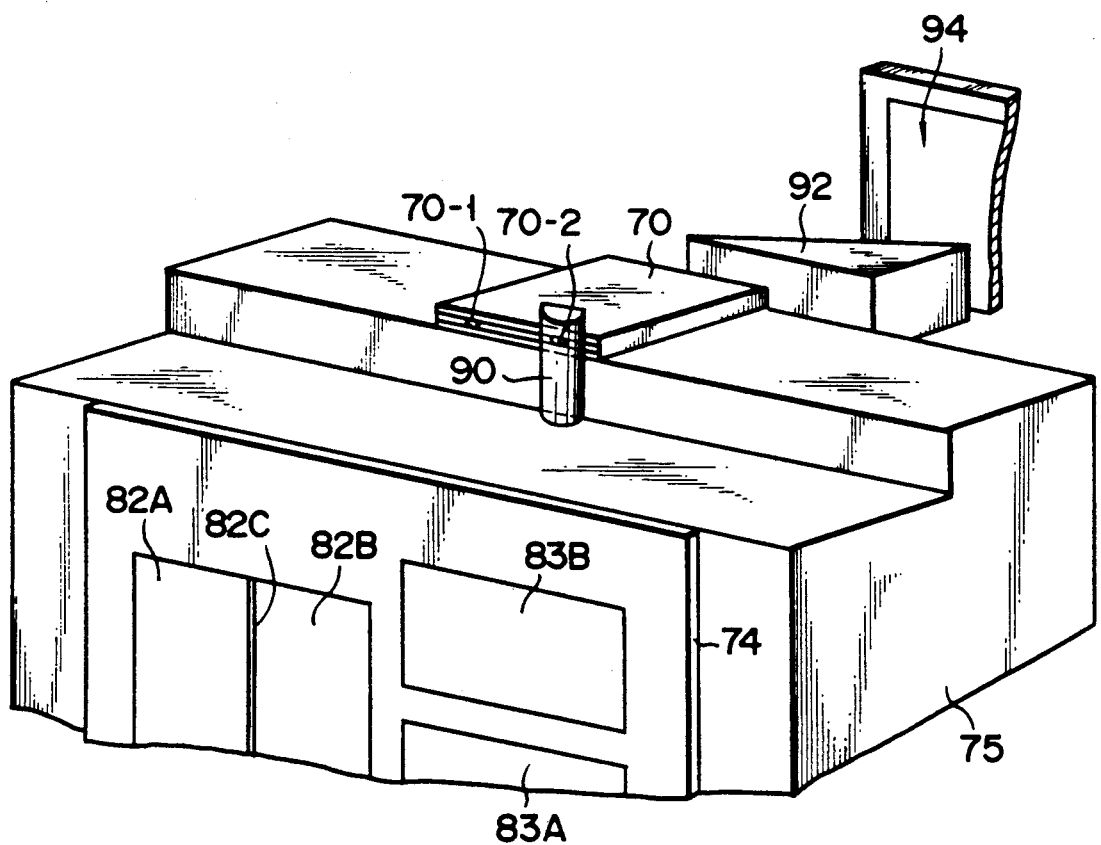
FIG. 5 is a perspective view of a light emitting apparatus arranged on the mount shown in FIG. 4 according to an embodiment of the present invention.
Figure 6:
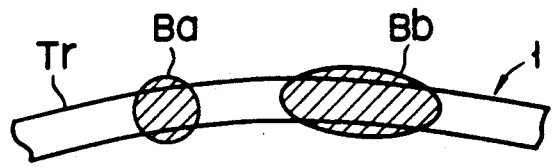
FIG. 6 is a plan view showing a beam spot formed on an optical disk.
Figure 7:
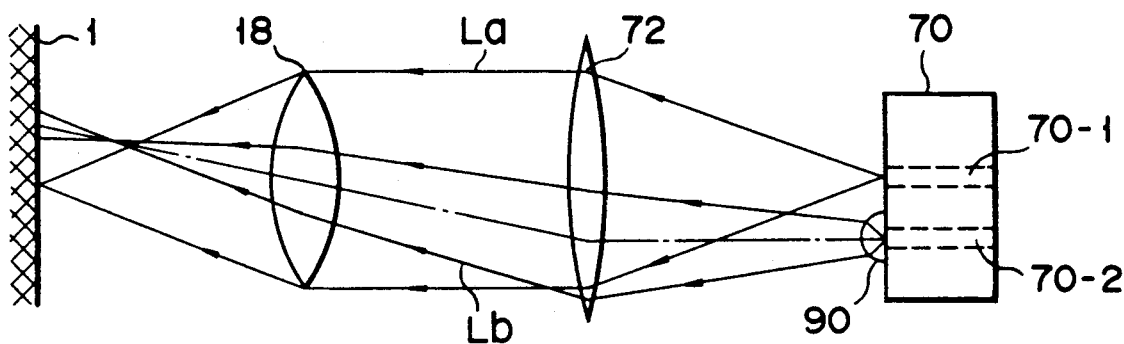
FIG. 7 is a view showing paths of laser beams from the light emitting apparatus shown in FIG. 5.
Figure 9:
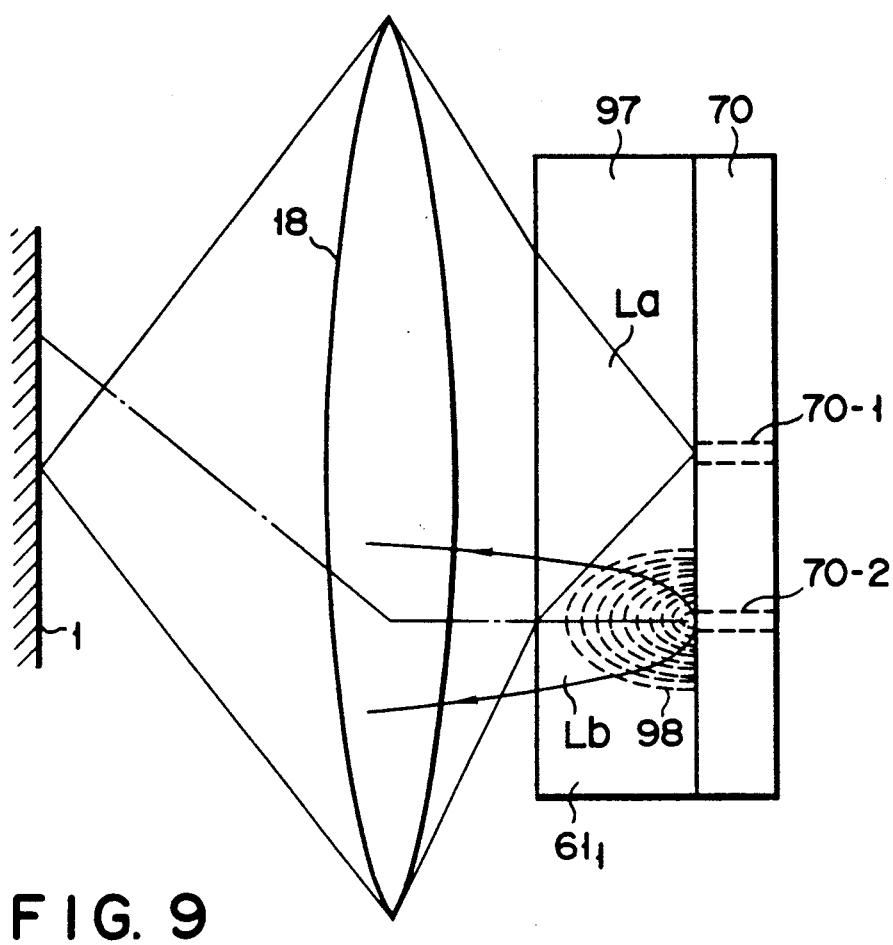

In the above-mentioned system, according to information recording, retrieving, and erasing processes, as shown in FIG. 6, circular beam spot Ba must be formed on tracking guide Tr of optical disk 1 by recording or retrieving laser beam La shown in FIG. 9, and elliptic beam spot Bb must be formed thereon by erasing laser beam Lb shown in FIG. 9. More specifically, recording or retrieving laser beam La having a circular crosssection must be focused on optical disk 1, and erasing laser beam Lb having an elliptic cross-section must also be focused on optical disk 1. In order to generate such laser beams, in the light emitting apparatus shown in FIG. 5, cylindrical lens 90 as an astigmatism lens is arranged in front of a light emitting point of semiconductor laser structure 70-2 of semiconductor laser array 70. Cylindrical lens 90 has a lens power in an extending direction of tracking guide Tr and in a plane including the light emitting point of second laser structure 70-2, and has no lens power in a plane perpendicular to this plane. Therefore, as shown in FIG. 7 schematically illustrating the optical system shown in FIG. 2, when objective lens 18 is in an in-focus state, retrieving or recording laser beam La is emitted from the light emitting point of first laser structure 70-1 of semiconductor laser array 70 and is converged by objective lens 18, so that a smallest circular beam spot is formed on optical disk 1. In contrast to this, erasing laser beam Lb emitted from the light emitting point of semiconductor laser structure 70-2 of semiconductor laser array 70 is converged in the extending direction of tracking guide Tr and the plane including the light emitting point of second laser structure 70-2, and is directed toward objective lens 18. Therefore, unlike retrieving or recording laser beam La, erasing laser beam Lb forms a focal point between objective lens 18 and optical disk 1, and is then radiated on the optical disk. As a result, elliptic beam spot Bb is formed on optical disk 1 as well as circular beam spot Ba extending along tracking guide Tr.

In the optical system which employs cylindrical lens 90 shown in FIG. 5 to convert a laser beam emitted from the light emitting point of laser structure 70-2 into an elliptic beam, the beam spot can be formed on the optical disk at a predetermined elliptic ratio.

In place of cylindrical convex lens 90 shown in FIG. 5, cylindrical concave lens 90 may be used.

In the light emitting apparatus shown in FIG. 5, prism 92 and photodetector 94 having a photodetecting area for detecting first and second monitor laser beams are arranged on the rear surface of semiconductor laser array 70 in order to detect the first and second monitor laser beams emitted from first and second laser structures 70-1 and 70-2 toward the rear surface of array 70, thereby stabilizing oscillation of structures 70-1 and 70-2, as described in U.S. patent application Ser. No. 018493, filed on Feb. 25, 1987 (now U.S. Pat. No. 4,825,064 issued on Apr. 25, 1989). The oscillation of structures 70-1 and 70-2 is controlled in accordance with a detection signal detected by the detection area of photodetector 94, thereby maintaining stable oscillation of structures 70-1 and 70-2. For further details, refer to U.S. Pat. No. 4,825,064.

Figure 8:
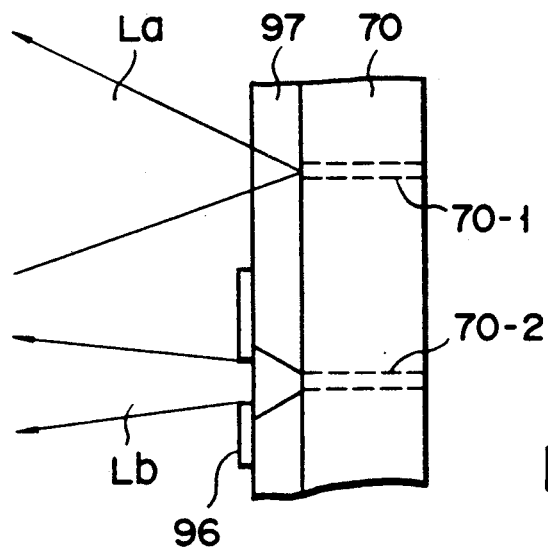
FIGS. 8 to 13 are views schematically showing light emitting apparatuses according to other embodiments of the present invention.

In place of astigmatism lens 90 for converting a laser beam emitted from the light emitting point of second laser structure 70-2 shown in FIG. 5 into a laser beam having an elliptic cross-section, another optical member may be adopted. More specifically, as shown in FIG. 8, slit 96 is arranged in front of the light emitting point of second laser structure 70-2 to restrict the laser beam from the emitting point of structure 70-2, thereby converting the laser beam from the light emitting point of structure 70-2 into a laser beam having a substantially elliptic cross-section. In the light emitting apparatus shown in FIG. 8, a transparent member, e.g., glass plate 97, is arranged on the entire surface of semiconductor laser array 70, and an aluminum film as a light shielding film is formed on plate 97 to form slit 96. Since slit 96 is formed as described above, desired slit 96 can be accurately formed, and hence, a beam spot can be formed on optical disk 1 at a predetermined elliptic ratio.

Figures 10A, 10B:
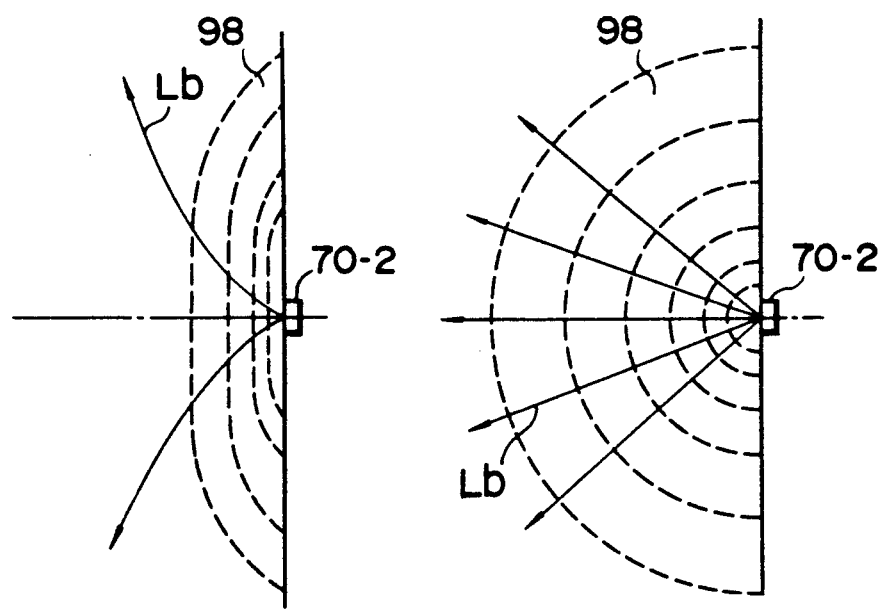
Figure 11:
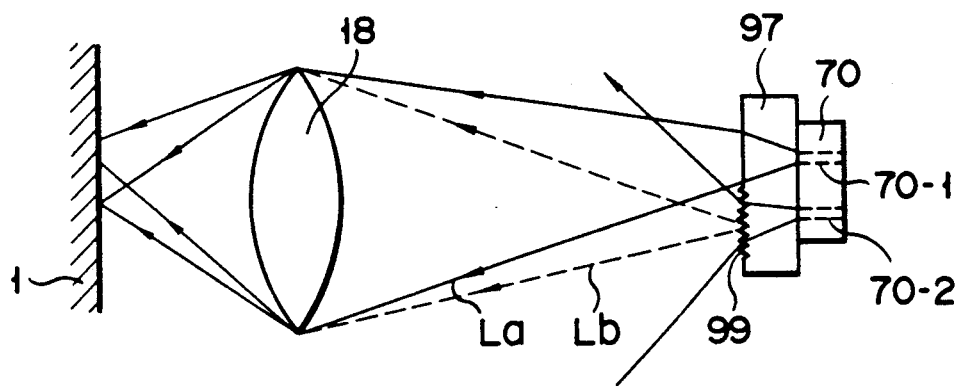

As shown in FIG. 9, when no slit 96 is formed on transparent plate 97, region 98 of transparent plate 97 in front of the light emitting point of second laser structure 70-2 may have a nonuniform refractive index, i.e., a refractive index distribution having a function optically equivalent to that of cylindrical lens 90. In order to provide such a refractive index distribution to plate 97, a metal ion field introduction method may be employed. More specifically, metal ions such as thallium ions are doped in transparent glass plate 97 to obtain a refractive index distribution as indicated by broken curves in FIG. 9. When plate 97 has the refractive index distribution as shown in FIG. 9, the refractive index distribution causes an erasing laser beam emitted from the light emitting point of second laser structure 70-2 to be converged in the plate toward objective lens 18 in the same manner as in the cylindrical convex lens. Then, the laser beam forms a focal point between objective lens 18 and optical disk 1 and is then radiated onto optical disk 1, in the same manner as in the optical system including cylindrical convex lens 90. Therefore, an elliptic beam spot shown in FIG. 6 is formed on optical disk 1. In order to provide the above refractive index distribution to plate 97, a natural diffusion method may also be employed so that the plate may be designed to have the refractive index distribution equivalent to the function of the cylindrical convex lens. More specifically, after a mask having a slit-like opening is formed on the surface of glass plate 97, the mask on plate 97 is brought into contact with a metal dopant material such as thallium, and the plate and the dopant material are heated, so that the dopant material is diffused in region 98 through the slit, as shown in FIGS. 10A and 10B. In refractive index distributions shown in FIGS. 10A and 10B, erasing beam Lb emitted from the light emitting point of second laser structure 70-2 is diverged according to the refractive index distribution of plate 97 in the plane including tracking guide Tr and the light emitting point of structure 70-2, and is directed toward objective lens 18, as shown in FIG. 10A. In contrast to this, as shown in FIG. 10B, in a plane perpendicular to the plane including tracking guide Tr and the light emitting point of structure 70-2, erasing beam Lb emitted from the light emitting point of structure 70-2 is directed toward objective lens 18 without being influenced by the diverging effect of the refractive index distribution. Therefore, erasing beam Lb emitted from the light emitting point of structure 70-2 is converted to a laser beam having an elliptic cross-section by plate 97, and becomes incident on objective lens 18. Then, an elliptic beam spot shown in FIG. 6 can be formed on optical disk 1. As can be seen from FIGS. 9, 10A, and 10B, a retrieving or recording laser beam emitted from the light emitting point of first laser structure 70-1 is not influenced by the lens effect in plate 97, and forms a smallest circular beam spot on optical disk 1 in an in-focus state.

Figure 12:
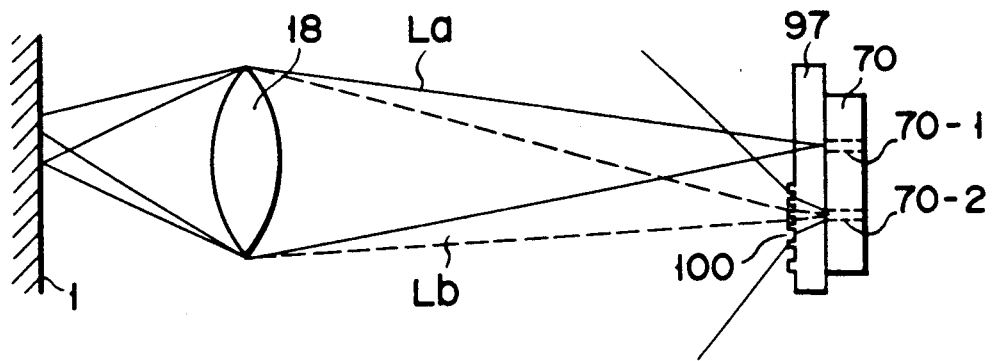
Figure 13:
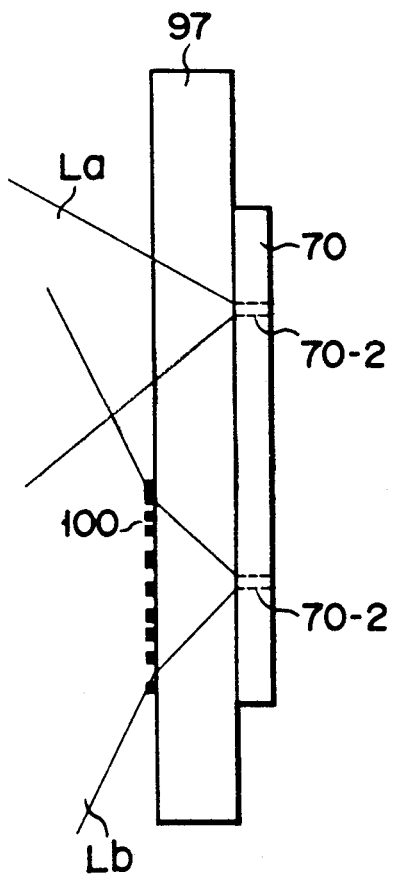

As shown in FIG. 12, Fresnel lens structure 99 may be formed on transparent plate 97, or as shown in FIG. 13, diffraction grating structure 100 may be formed on plate 97. Fresnel lens structure 99 is formed by forming projecting and recess segments respectively having a lens effect on transparent plate 97, and has a similar function to that of the astigmatism lens. Structure 99 can convert an erasing laser beam emitted from the light emitting point of second laser structure 70-2 into a laser beam having an elliptic shape. Therefore, an elliptic beam spot can be formed on optical disk 1. Diffraction grating structure 100 is formed by non-periodically forming slits on transparent plate 97. An erasing laser beam emitted from the light emitting point of second laser structure 70-2 is diffracted in the plane including tracking guide Tr and the light emitting point of structure 70-2 by diffraction grating structure 100 so as to be substantially diverged toward objective lens 18. On the other hand, the erasing laser beam is not diffracted in a plane perpendicular to the above plane, and is directed toward objective lens 18. Therefore, the erasing beam emitted from the light emitting point of structure 70-2 is converted to a light beam having a substantially elliptic cross-section by diffraction grating structure 100, and an elliptic beam spot is formed on optical disk 1. Structure 100 is formed such that a photoresist is applied to plate 97, is exposed using a non-periodical pattern, and glass is etched using the exposed photoresist as a mask. Structure 100 may be formed by a mask having slits as shown in FIG. 14. Structure 100 shown in FIG. 14 is formed such that a thin metal film for shielding light such as a chromium or aluminum film is formed on glass plate 97, a photoresist film is formed thereon, and thereafter, the photoresist film is exposed to be etched.

According to the present invention as described above, a light emitting apparatus which can form an elliptic beam spot on optical disk 1 at a predetermined elliptic ratio can be provided.

What is claimed is:

1. A system for retrieving and erasing information from an information recording medium having a track and for recording information onto the information recording medium, comprising:
    a light emitting apparatus including:
        light emitting means, having first and second light emitting points, for emitting first and second light beams from the first and second light emitting point, respectively, the light emitting points being closely arranged; and
        optical means, arranged in front of the second light emitting point, for allowing only the second light beam to pass therethrough and modifying only the cross section of the second light beam emitted from the second light emitting point; and
    means arranged thereafter for converging the first and second light beams onto the information recording medium, the first light beam forming a substantially circular beam spot and the second light beam forming a substantially elliptical erasing beam spot extending along the track on the information medium.

2. An apparatus according to claim 1 wherein said optical means causes the light beam to converge or diverge in a first plane.

3. An apparatus according to claim 2, wherein said optical means comprises an astigmatism lens.

4. An apparatus according to claim 3, wherein said astigmatism lens comprises a cylindrical lens.

5. An apparatus according to claim 3, wherein said astigmatism lens comprises a Fresnel lens.

6. An apparatus according to claim 1, wherein said optical means includes a stop having an aperture allowing the second light beam to pass therethrough.

7. An apparatus according to claim 1, wherein said optical means includes a diffraction grating for diffracting the second light beam.

8. An apparatus according to claim 1, wherein said optical means includes a transparent plate having a region of a predetermined refractive index distribution through which the second light beam passes.

9. An apparatus according to claim 1, wherein said light emitting means includes a semiconductor laser array.

10. A system according to claim 1, wherein the light emitting means has a unitary structure.

11. An optical system for generating light beams for retrieving and erasing information from, and recording information onto an information recording medium having a track, the optical system comprising:
    light emitting means, having first and second light emitting points, for emitting first and second light beams from the first and second light emitting points, said first and second light beams being generally elliptical and diverging from said first and second light emitting points, respectively;
    optical means, arranged in front of the second light emitting point, for increasing the divergence of the second light beam emitted from the second light emitting point; and
    means for converging the first and second light beams toward the information recording medium, the first light beam forming a substantially circular beam spot and the second light beam forming a substantially elliptical beam spot extending along the track on the information medium.

12. An optical system according to claim 11, wherein said optical means includes means for increasingly diverging the second light beam in a first plane, the second light beam forming a spot elongated along the track on the information recording medium.

13. An optical system according to claim 12, wherein said optical means comprises an astigmatism lens.

14. An optical system according to claim 11, wherein said optical means includes a stop having an aperture allowing the second light beam to pass therethrough.

15. An optical system according to claim 11, wherein said optical means includes a diffraction grating for diffracting the second beam.

16. An optical system according to claim 11, wherein said optical means comprises a transparent plate having a region of a predetermined refractive index distribution through which the second light beam passes.

17. An optical system according to claim 11, wherein said light emitting means includes a semiconductor laser array.

18. An optical system according to claim 11 wherein said optical means causes the second light beam increasingly to diverge in a first plane such that the elliptical beam spot precedes said circular beam spot along the track on the information medium.

19. An optical system according to claim 18, wherein said optical means comprises an astigmatism lens.

20. An optical system according to claim 17, wherein said optical means includes a stop having an aperture allowing the second light beam to pass therethrough.

21. An optical system according to claim 17, wherein said optical means includes a diffraction grating for diffracting the second light beam.

22. An optical system according to claim 17, wherein said optical means includes a transparent plate having a region of a predetermined refractive index distribution through which the second light beam passes.

23. An optical system according to claim 13, wherein said light emitting means includes a semiconductor laser array, and the lens contacts the second light emitting point at the array.

24. A light emitting apparatus comprising:
light emitting means, having first and second light emitting points, for emitting first and second light beams from the first and second light emitting points, respectively, the light emitting points being closely arranged; and
optical means, arranged in front of the second light emitting point, for allowing only the second light beam to pass therethrough, modifying only the cross section of the second light beam emitted from the second light emitting point, and causing the second light beam to diverge or converge in a first plane, whereby the first and second light beams have differing cross-sections, said optical means comprising an astigmatism lens.

25. An apparatus according to claim 24, wherein said light emitting means includes a semiconductor laser array.

26. An apparatus according to claim 24, wherein the light emitting means has a unitary structure.

27. An apparatus according to claim 21, wherein said astigmatism lens comprises a cylindrical lens.

28. An apparatus according to claim 24, wherein said astigmatism lens comprises a Fresnel lens.

29. A light emitting apparatus comprising:
light emitting means, having first and second light emitting points, for emitting first and second light beams from the first and second light emitting points, respectively, the light emitting points being closely arranged; and
optical means, arranged in front of the second light emitting point, for allowing only the second light beam to pass therethrough and modifying only the cross section of the second light beam emitted from the second light emitting point, whereby the first and second light beams have differing cross-sections, said optical means including a stop having an aperture allowing the second light beam to pass therethrough and a diffraction grating for diffracting the second light beam.

30. An apparatus according to claim 29, wherein said optical means comprises a transparent plate having a region of a predetermined refractive index distribution through which the second light beam passes.

31. An apparatus according to claim 29, wherein said light emitting means includes a semiconductor laser array.

32. An apparatus according to claim 29, wherein the light emitting means has a unitary structure.

* * * * *

UNITED STATES PATENT AND TRADEMARK OFFICE
CERTIFICATE OF CORRECTION

PATENT NO. : 5,018,127
DATED : May 21, 1991
INVENTOR(S) : Hideo Ando

It is certified that error appears in the above-identified patent and that said Letters Patent is hereby corrected as shown below:

Claim 1, column 9, line 67, change "point" to --points--.

Claim 2, column 10, line 14, before "light" insert --second--.

Claim 27, column 12, line 11, change "21" to --24--.

Signed and Sealed this

Thirteenth Day of April, 1993

*Attest:*

STEPHEN G. KUNIN

*Attesting Officer*   *Acting Commissioner of Patents and Trademarks*